(12) United States Patent
Takaku et al.

(10) Patent No.: US 7,307,359 B2
(45) Date of Patent: Dec. 11, 2007

(54) OPERATION DEVICE

(75) Inventors: Norio Takaku, Nakano-ku (JP); Takao Suzuki, Nakano-ku (JP)

(73) Assignee: Calsonic Kansei Corporation, Tokyo (JP)

( * ) Notice: Subject to any disclaimer, the term of this patent is extended or adjusted under 35 U.S.C. 154(b) by 220 days.

(21) Appl. No.: 10/949,804

(22) Filed: Sep. 27, 2004

(65) Prior Publication Data

US 2005/0093368 A1    May 5, 2005

(30) Foreign Application Priority Data

Sep. 25, 2003   (JP)   ............................. 2003-334109

(51) Int. Cl.
*B60L 3/00*   (2006.01)
(52) U.S. Cl. ................................... 307/10.1
(58) Field of Classification Search ............... 307/10.1, 307/116; 701/36, 45
See application file for complete search history.

(56) References Cited

U.S. PATENT DOCUMENTS 5,952,730 A * 9/1999 Haller et al. ............... 307/10.1
6,181,996 B1 * 1/2001 Chou et al. ................. 701/36
6,459,169 B1 * 10/2002 Onodera ..................... 307/10.1

FOREIGN PATENT DOCUMENTS

JP    7-306055 A    11/1995
JP    8-184449 A    7/1996

OTHER PUBLICATIONS

Machine translation of disclosed forign patent document JP 08-18449.*

* cited by examiner

*Primary Examiner*—Michael Sherry
*Assistant Examiner*—Nicholas Ieva
(74) *Attorney, Agent, or Firm*—Foley & Lardner LLP (57) ABSTRACT

An operation device capable of securely identifying whether an operation is performed by a driver or by a passenger on a front passenger seat are provided. In the periphery of a multidirectional input portion and switch input portions of an operation switch unit provided on a console between a driver seat and a front passenger seat of a vehicle and at diagonal positions relative to the multidirectional input portion and the switch input portions, identifying sensors which detect an approach of a hand of an operator are respectively provided, and an operation control unit which identifies the operator by outputs from the identifying sensors and is provided.

7 Claims, 7 Drawing Sheets

OPERATION DEVICE

BACKGROUND OF THE INVENTION

1. Field of the Invention

The present invention belongs to a technical field of an operation device which is mainly provided inside a passenger compartment of a motor vehicle or the like, operable either by a driver or a passenger on a front passenger seat, and capable of identifying the operator.

2. Description of the Related Art

An operation device of this kind is disclosed in Japanese patent laying-open publication (Tokkaihei) No. 7-306055. In this operation device, an arm of a passenger on a front passenger seat of a motor vehicle being stretched out to operate an on-vehicle navigation system is detected by infrared rays using an infrared emitting diode and an infrared receiving diode.

Further, another operation device is disclosed in Japanese patent laying-open publication (Tokkaihei) No. 8-184449. In this operation device, a pulse beam sensor is used to detect an arm of a driver being stretched out to operate a navigation system, and an infrared area sensor is used to detect an arm of a passenger on a front passenger seat being stretched out to operate the navigation system.

However, in the conventional operation devices, a dedicated sensor separated from an operation portion must be used to release an operation restriction of a passenger. Further, the switch and the sensor are separated and thus the detection becomes inaccurate, so that, in order to increase accuracy, a detection distance must be made long.

The present invention is made in view of the above described problems, and an object thereof is to provide an operation device which is capable of securely identifying which of a driver and a front passenger operates the operation device.

SUMMARY OF THE INVENTION

In order to achieve the above-described object, an operation device according to the present invention includes: an operation switch provided between a driver seat and a front passenger seat of a vehicle; an operator detecting sensor, a pair of proximity detectors for detecting a proximity of a hand of an operator in the periphery of the operation switch; and an operator identifying unit for identifying the operator. The operation switch is configured in such a manner that the palm of the operator is placed on a top surface of the operation switch to be inputted by the operator. The operator detecting sensor detects whether the palm of the operator is positioned on the top surface of the operation switch to input an operation. The pair of proximity detectors is arranged on a driver seat side of the operation switch and on a front Passenger seat side of the operation switch so as to have a diagonal relationship with the operation switch where at least one of the proximity detectors is incapable of detecting the proximity of a hand of a driver when a palm of the driver is positioned on the top surface of the operation switch and both of the proximity detectors are capable of detecting the proximity of a hand of a passenger on a front seat when a palm of the passenger is positioned on the top surface of the operation switch. The operator identifying unit identifies the operator based on outputs from the proximity detectors when the operator detecting sensor detects that the palm is positioned on the operation switch.

Therefore, according to the operation device of the invention, a detection distance can be shortened to improve identification performance. Further, the fact that the detection distance can be shortened allows downsizing of the system.

Preferably, the proximity detector includes a first proximity detecting sensor and a second proximity detecting sensor, the first and second proximity detecting sensors are arranged on a diagonal line so that the operation switch is interposed therebetween, and the first proximity sensor and the second proximity sensor are arranged on a front oblique position and a rear oblique position of the operation switch respectively.

Therefore, a difference in shapes between the left hand and the right hand of a driver and a passenger is detected by the proximity detector to thereby perform secure identification.

Preferably, the operator identifying unit controls an operation restriction/release of restriction of the operation switch depending on an identification result.

Therefore, it is possible to more securely perform for safety the restriction on operation of an on-vehicle apparatus by the driver while driving the vehicle and the release of the operation restriction carried out when the passenger performs operations. Therefore, the safety and the convenience are made compatible.

Preferably, the operation switch is capable of controlling operations of a plurality of on-vehicle apparatuses.

Therefore, the operation restriction/release of the restriction of a plurality of on-vehicle apparatuses can be realized at a reduced cost with increased convenience.

Preferably, the operation switch is configured to be operated by placing a hand on a top surface of the operation switch.

Therefore, a difference in shapes between the left hand and the right hand of a driver and a passenger when performing an operation by placing a hand on the top surface of the switch can be detected by the proximity detector, which enables secure identification.

Preferably, based on an identification result by the operator identifying unit, an operation mode is selected from a front passenger seat mode to allow all operations while the vehicle is running, a driver mode to prohibit complicated operations while the vehicle is running, and a vehicle stop mode to allow all operations while the vehicle is stopped.

Therefore, the driver becomes unable to perform complicated operations using the operation switch while the vehicle is running to thereby improve safety, and then the passenger on the front passenger seat is allowed to perform operations with the operation switch to thereby improve convenience.

Preferably, a simple operation by a passenger on a front passenger seat is performed in the driver mode, and a process is initialized when a predetermined time passes after a complicated operation by the passenger on the front passenger seat is completed.

Therefore, a simple operation by the passenger on the front passenger seat is performed in the driver mode, so that the driver is prevented from avoiding the operation restriction by performing an operation just after the passenger performs an operation, and the processing is initialized when the predetermined time passes after the complicated operation is performed by the passenger on the front passenger seat, so that the driver is prevented from avoiding the operation restriction by performing an operation just after the passenger performs an operation. Therefore, the safety can be her improved.

BRIEF DESCRIPTION OF THE DRAWINGS

The objects, features and advantages of the present invention will become apparent as the description proceeds when taken in conjunction with the accompanying drawings, in which.

DETAILED DESCRIPTION OF THE PREFERRED EMBODIMENTS

Hereinafter, an operation device according to an embodiment of the present invention and a navigation system 100 operated with this operation device will be described based on the attached drawings. Incidentally, the navigation system 100 is integrated with an audio system in this embodiment, and here the operation device is for the navigation system, but it is not limited to the navigation system.

Figure 1:
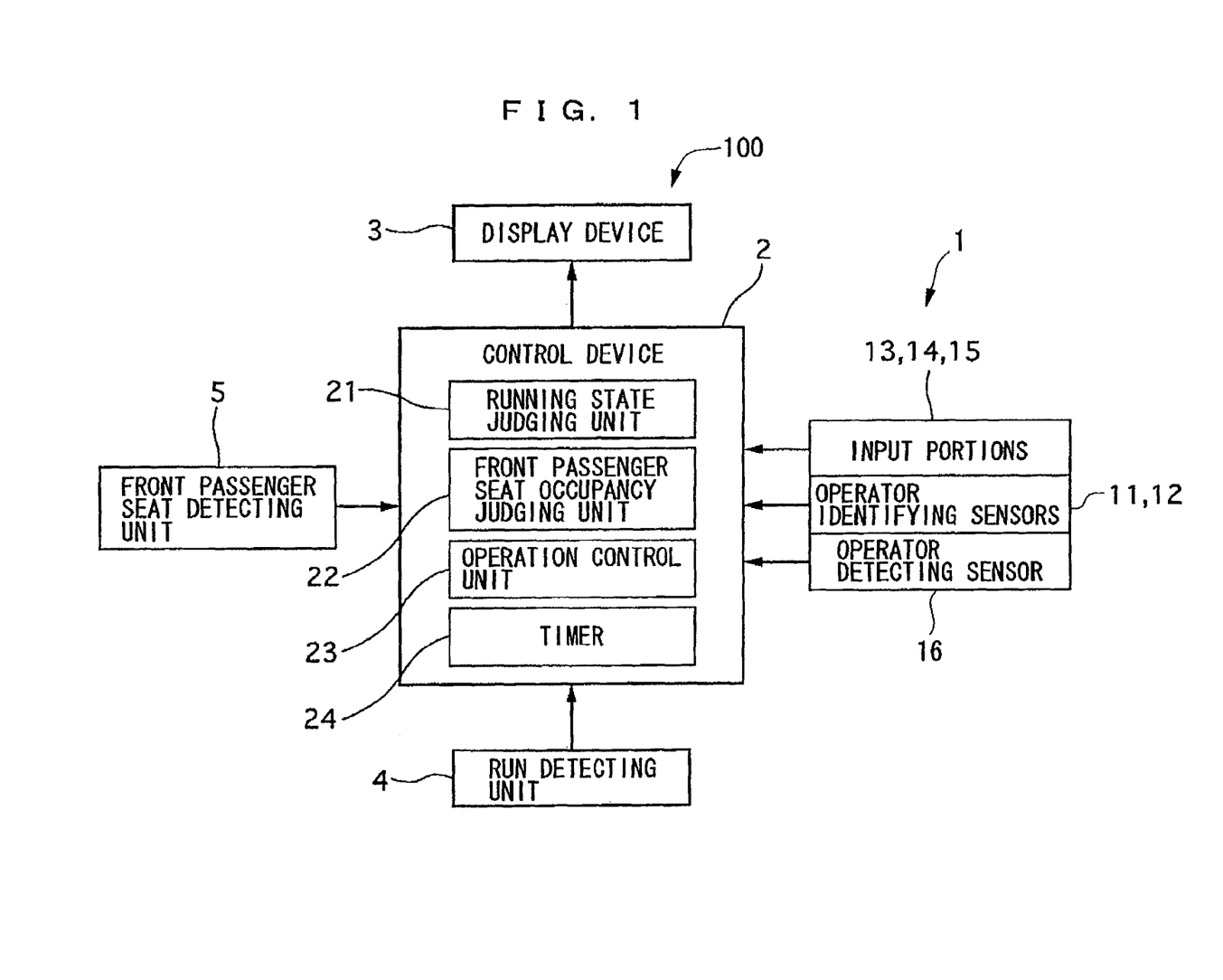
FIG. 1 is a block diagram showing a configuration of an operation device of a first embodiment.

FIG. 1 is a block diagram showing the configuration of the navigation system 100 having an operation switch unit 1. The navigation system 100 has the operation switch unit 1 for operating the system 100, a control device 2 for executing various processing including operator identification processing and for generating navigation information, a display device 3 for displaying navigation information or the like processed in the control device 2, a run detecting unit 4 for detecting whether a motor vehicle is running or not, and a front passenger seat detecting unit 5 for detecting whether there is a person on a front passenger seat or not.

These elements will be described in more detail below.

Figure 2:
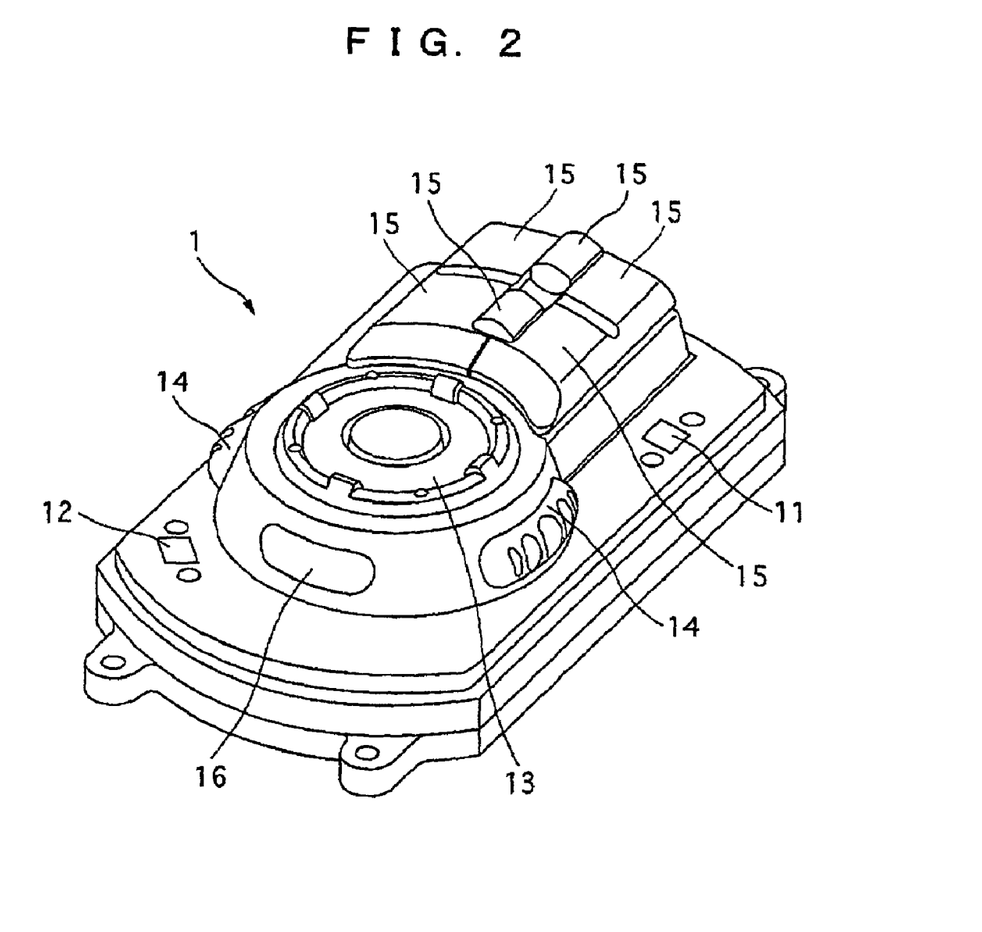
FIG. 2 is a perspective view of an operation switch unit of the operation device of the embodiment.
Figure 3:
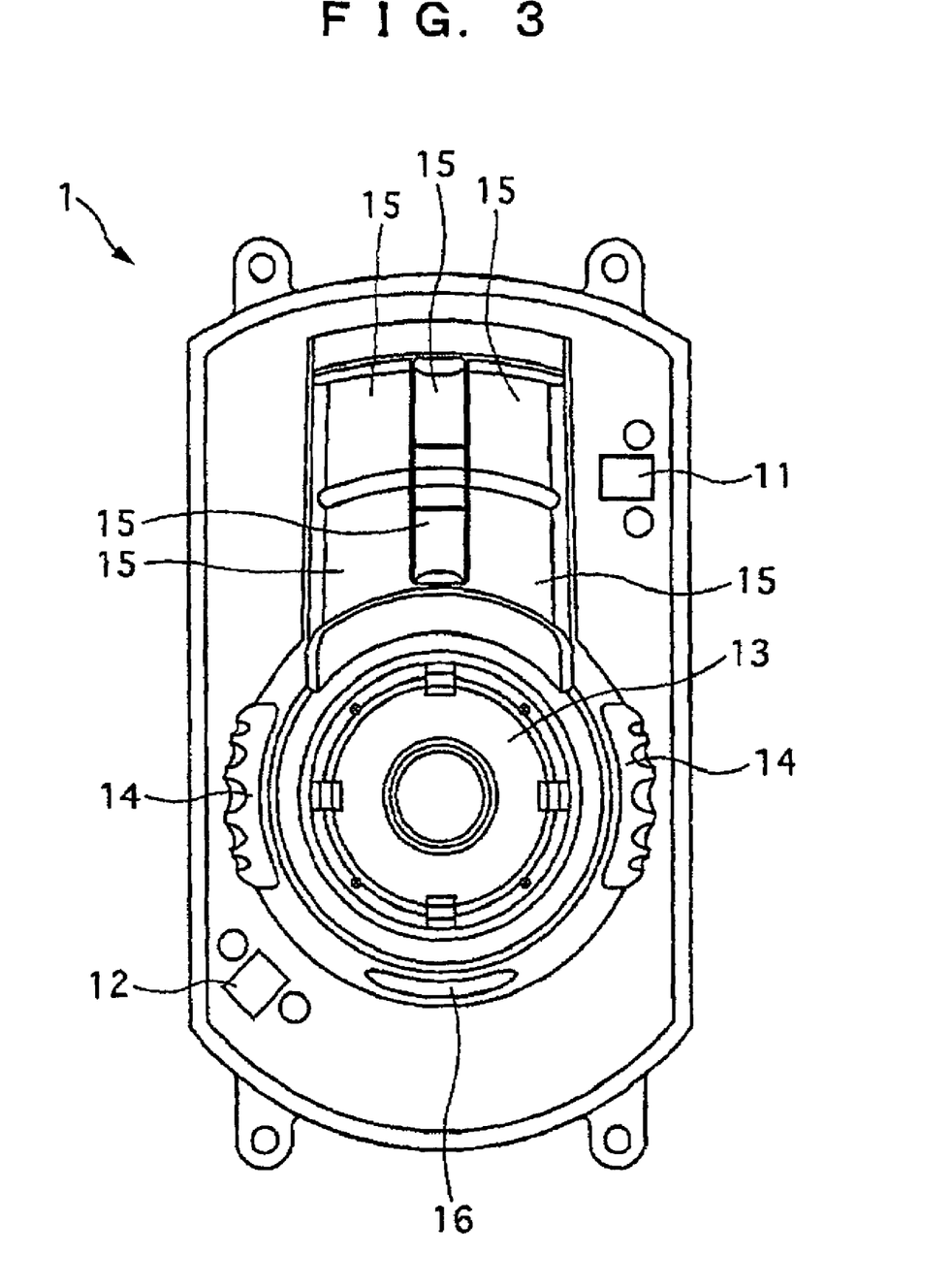
FIG. 3 is a plan view of an operation switch unit of the operation device of the embodiment.

Referring to FIGS. 1 to 3 of the drawings, two operator identifying sensors 11 and 12 are equivalent to a proximity detector of the present invention, and constituted by a first operator identifying sensor 11 for detecting at a front side of a multidirectional input portion 13 and a driver seat side an operation by a driver and a second operator identifying sensor 12 for detecting at a rear side of the multidirectional input portion 13 and a front passenger seat side an operation by a user on the front passenger seat. The first and second operator identifying sensors 11 and 12 are arranged on a surface side on which the multidirectional input portion 13 and switch input portions 15 exist so that the identifying sensors 11 and 12 are located on a driver seat side of the switch input portions 15 and on a front passenger seat side of a multidirectional input portion 13 and rotational direction input portions 14, respectively, so as to have a diagonal relationship with the operation switch unit 1.

Each of the first and second operator identifying sensors 11 and 12 and an operator detecting sensor 16 uses a sensor which detects reflection of an infrared ray, and in this embodiment, a sensor which detects a very close distance, for example, of 10 to 20 mm is used.

The display device 3 is constituted by a liquid crystal display (LCD) or a cathode ray tube (CRT) and displays an operation mode for clearly showing an operator operations assigned to the above-described respective operation switches 13, 14 and 15, and used for various display by an on-vehicle apparatus such as a navigation system.

The run detecting unit 4 detects running of the vehicle, and outputs its detection results to the control device 2. Specifically, the run detecting unit 4 may be a vehicle speed sensor, an inhibitor switch which detects a select position of an automatic transmission, a parking brake lever switch which detects an operation of a parking brake, a wheel sensor which detects rotation of a wheel, a gyro or a Global Positioning System (GPS) which detects a moving position of a motor vehicle, or the like.

The front passenger seat detecting unit 5 detects whether there is a passenger on the front passenger seat or not, and outputs a detection result to the control device 2. Specifically, the front passenger seat detecting unit 5 may be a sensor which detects detachment/attachment of a seat belt, a sensor which detects load on a seat, or the like.

The control device 2 includes a running state judging unit 21 which judges whether or not a vehicle is in a running state based on a detection signal from the run detecting unit 4, a front passenger seat occupancy judging unit 22 for judging whether or not there is a passenger on a front passenger seat based on a detection signal from the front passenger seat detecting unit 5, an operation control unit 23 which identifies whether an operator is a driver or a passenger on the front passenger seat based on information from the multidirectional input portion 13, the rotational direction input portions 14, and the identifying sensors 11 and 12 of the operation switch unit 1. The control device 2 performs various processing including an operation restriction/release of restriction corresponding to an operation device and operation contents based on an operation signal from switch input portions 15, and a timer 24 which measures time as needed by processing in the control device 2.

Note that the operation switch unit 1 with the sensors 11, 12, and 16 and the operation control unit 23 constitute an operation device of the present invention.

As shown in FIG. 2 and FIG. 3, the operation switch unit 1 is provided on a top surface of a console between the driver seat side and the front passenger seat side of the vehicle, and is mounted so that the switch input portions 15 are located on the front side of the vehicle and an operator detecting sensor 16 is located on the rear side of the vehicle.

The operation switch unit 1 has the multidirectional input portion 13 from which protrudes a part of a spherical portion that is basically operated with a palm being positioned thereon, the rotational direction input portions 14 for inputting a rotational direction, the plurality of switch input portions 15 that are operated by pressing down, the operator detecting sensor 16 which detects whether or not a palm is positioned thereon to input an operation regardless of whether it is a driver or a passenger, and the operator identifying sensors 11 and 12 for identifying whether the operator is the driver or a user on the front passenger seat.

Next, operations of the operation device and the navigation system 100 that is operated by the operation switch unit 1 will be described.

First, a flow of processing of operator identification, operation restriction, and release of restriction will be described.

Figure 5:
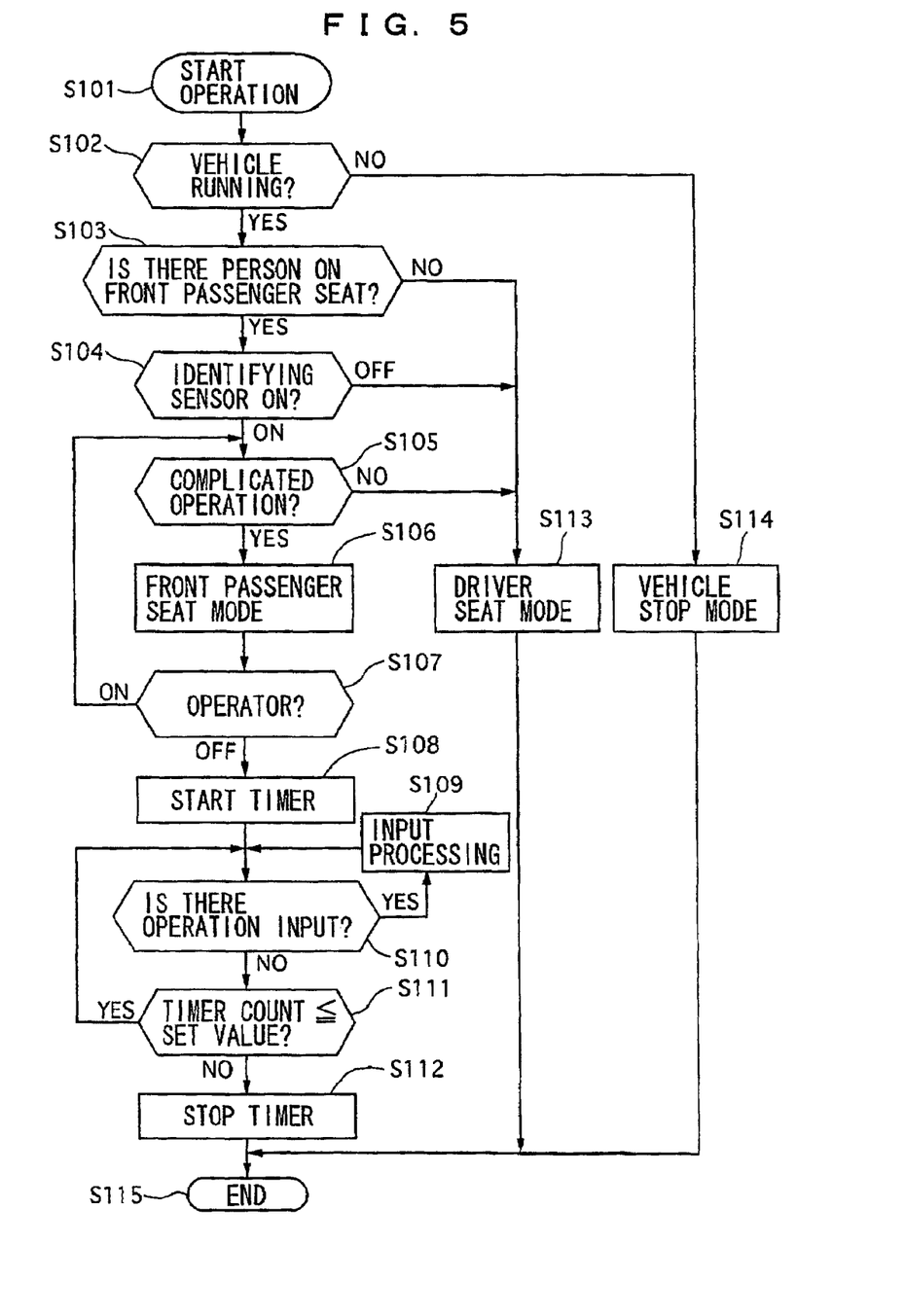
FIG. 5 is a flowchart showing a flow of processing carried out with the operation switch unit of the operation device of the embodiment.

FIG. 5 is a flowchart showing the flow of processing of operator identification, operation restriction, and release of restriction executed in the control device 2 and the operating switch unit 1, and respective steps thereof will be described below.

In step S101, upon detection of proximity of a palm of an operator by the operator detecting sensor 16, the operation control unit 23 starts main processing.

In step S102, based on a detection signal from the run detecting unit 4, the running state judging unit 21 judges whether the vehicle is running or not. If YES, the flow goes to step S103, while, if NO the flow goes to step S114.

In step S103, based on a detection signal from the front passenger seat detecting unit 5, the front passenger seat occupancy judging unit 22 judges whether there is a passenger on the front passenger seat or not. If YES, the flow goes to step S104, while, if NO the flow goes to step S113.

In step S104, based on detection signals from the first and second identifying sensors 11 and 12, the operation control unit 23 judges whether either of the sensors is detecting an operator or not. If either of the identifying sensors 11 and 12 is ON and detecting the operator, the flow goes to step S105, while, if both of the identifying sensors 11 and 12 are OFF and not detecting the operator, the flow goes to step S113.

In step S105, it is judged whether the contents of an operation inputted by the operator are of a complicated operation or not. If YES, the flow goes to step S106, while, if NO, the flow goes to step S113. Incidentally, regarding the contents of an operation of a navigation system or an audio system, operations which are easy to perform even while a driver is driving, for example adjusting the volume of an audio system, can be performed without moving a line of sight from a visual range for driving. Conversely, there are operations having a high possibility to be performed by a driver by moving his/her line of sight from a visual range for driving, in other words, operations which are not desired to be performed for safety reasons. For the navigation system in this embodiment, an example of such an operation is setting a destination point, and such an operation that is not desired to be performed while driving is a complicated operation.

In step S106, an operation mode is set to a front passenger seat mode. In the front passenger seat mode, all operations are possible even while the vehicle is running.

In step S107, it is judged which of the identifying sensors 11 and 12 is ON. If both the identifying sensors 11 and 12 are ON, the flow goes to step S105, while, if both the identifying sensors 11 and 12 are OFF, the flow goes to step S108.

In step S108, the timer 24 is activated to start measurement of an elapsed time.

In step S109, input processing in the front passenger seat mode which allows complicated operations is performed.

In step S110, it is judged by the operation control unit 23 whether there is an operation input or not. If YES, the flow goes to step S109, while, if NO the flow goes to step S111.

In step S111, it is judged whether the elapsed time measured by the timer 24 is equal to or longer than a set time value. If the elapsed time is equal to or shorter than a set time value, the flow goes to step S110, while, if the elapsed time is longer than a set time value, the flow goes to step S112.

In step S112, the measurement of the elapsed time by the timer 24 is stopped.

In step S113, the operation mode is set to a driver mode. In the driver mode, an operation restriction is carried out to prohibit complicated operations while the vehicle is running.

On the other hand, when it is detected in step S102 that the vehicle is stopped, the operation mode is set to a vehicle stop mode in step S114. In the vehicle stop mode, all kinds of operations are allowed.

Next, a secure operator identifying operation will be described. First, when the passenger on the front passenger seat performs a complicated operation while the vehicle is running, it is performed as follows.

When the passenger on the front passenger seat performs a complicated operation using the operation switch unit 1 while the vehicle is running, the passenger holds out his/her hand to the operation switch unit 1 so as to place his/her hand on the operation switch unit 1 to perform an operation, and then the operator detecting sensor 16 detects the start of the operation.

The operation switch unit 1 in this embodiment is used in such a manner that, as shown in FIG. 2 and FIG. 3, a palm is placed on the multidirectional input portion 13 in a sphere shape whose one part is protruding upward, fingers from the index finger to possibly the third finger are placed on the switch input portions 15, and the thumb is positioned so as to operate one of the rotational direction input portions 14 as necessary.

Figure 4A:
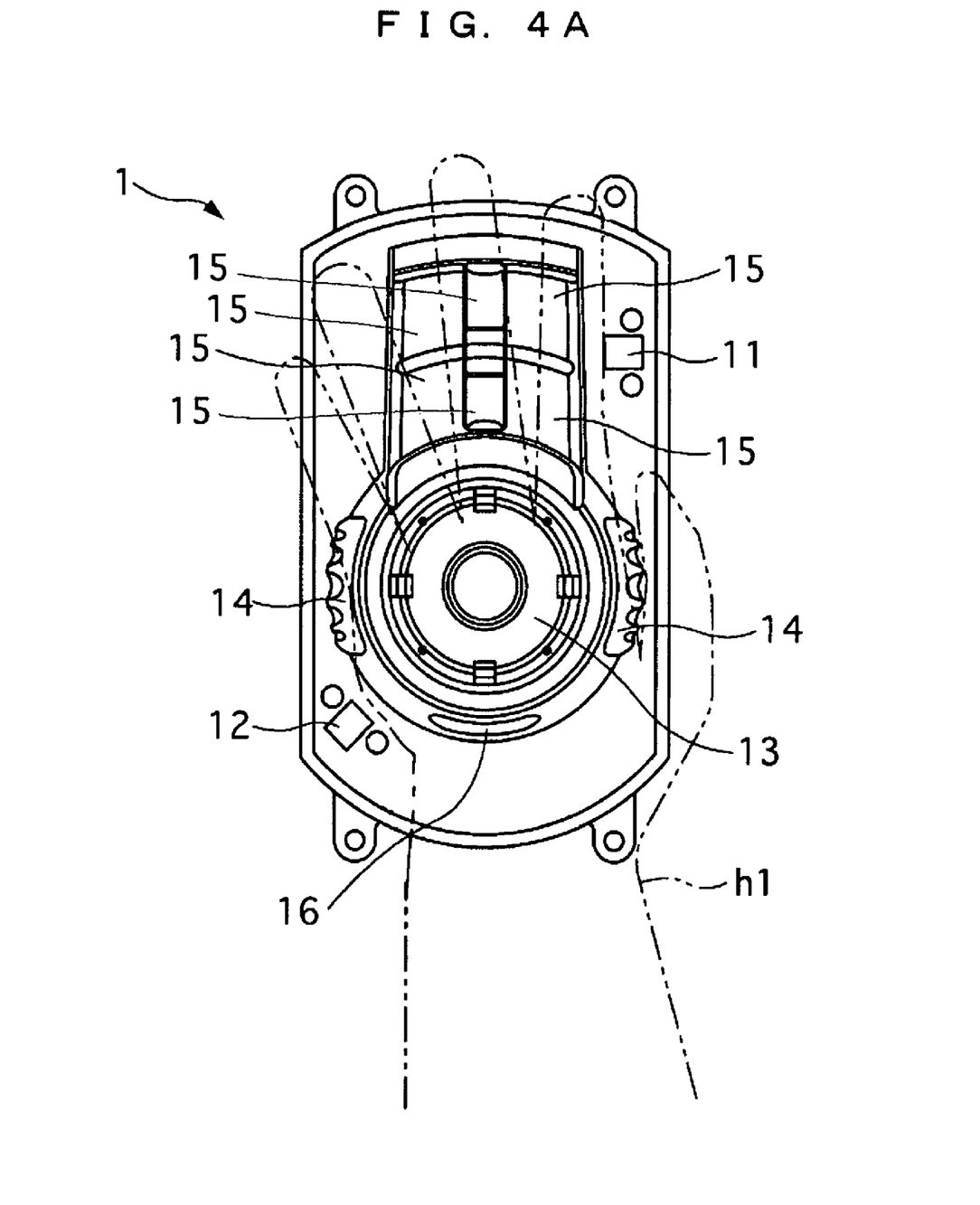
FIG. 4A and FIG. 4B are explanatory views showing states of operating the operation switch unit of the operation device of the embodiment by a driver and by a passenger on a front passenger seat, respectively.
Figure 4B:
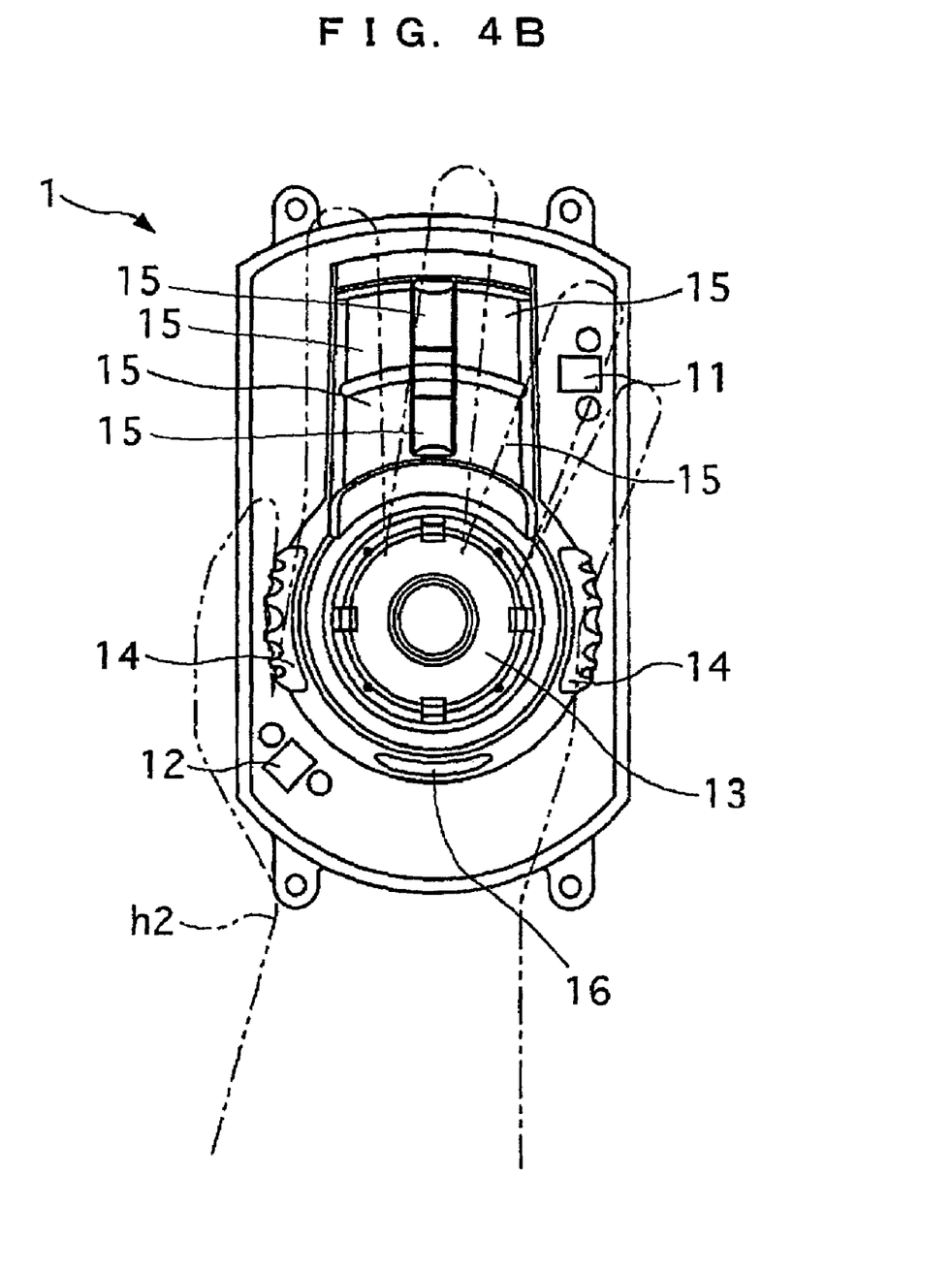

Further, since this operation switch unit 1 is provided on the console between the driver seat and the front passenger seat, the driver operates by the left hand h1 as shown in FIG. 4A, and the passenger on the front passenger seat operates by the right hand h2 as shown in FIG. 4B.

Therefore, in a state shown in FIG. 4B that the passenger on the front passenger seat places his/her hand h2 on the operation switch unit 1, both the identifying sensors 11 and 12 arranged diagonally are in a detecting state during processing in step S105. When this detection by both the identifying sensors 11 and 12 are active and the operation with the operation switch unit 1 is a complicated operation, the operation control unit 23 sets the operation mode to the front passenger seat mode by processing in step S105 and step S106 to thereby permit complicated operations.

Figure 6:
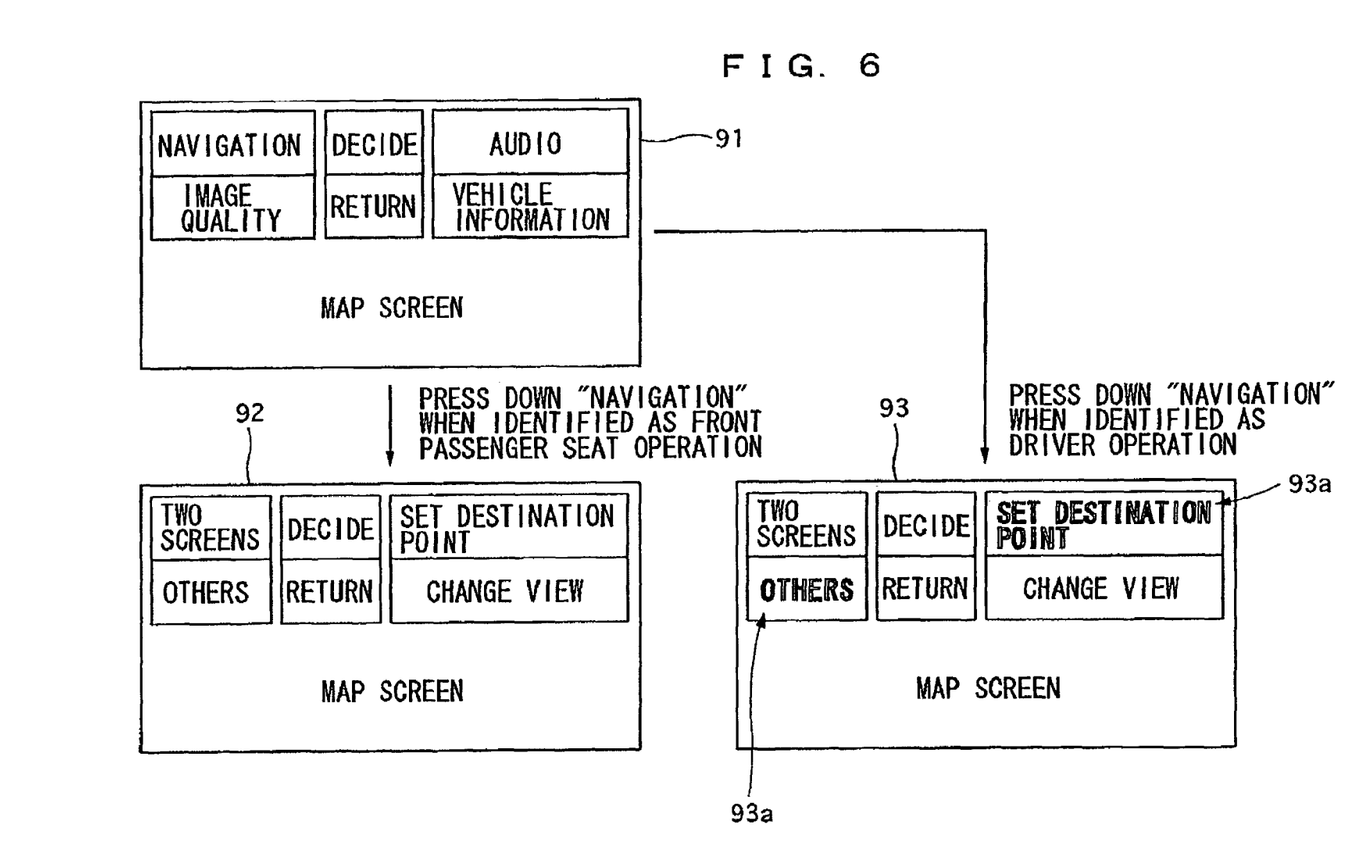
FIG. 6 is an explanatory view showing examples of display on a display device when operating with the operation switch unit of the operation device of the embodiment.

Specifically, for example, as screens 91 and 92 of the display device 3 shown in FIG. 6, on an operation screen of the navigation system, when it is identified that an operation is performed by the passenger on the front passenger seat, the screen changes by the operation from the screen 91 to the screen 92 to allow all kinds of operations. In this case, when the passenger on the front passenger seat performs a complicated operation while the vehicle is running, it does not affect safety of the running vehicle, so that it will not be a problem. Further, carrying out of a complicated operation by the passenger on the front passenger seat instead of the driver is rather a support for the driver, so that it is preferable.

After the operation is thus performed by the passenger on the front passenger seat, an operation is allowed immediately thereafter within a predetermined time by processing in steps S108 to S111 even when the hand h2 is moved off so as to allow a series of operations, and also re-holding of the switching unit 1 is allowed, so that it can be used conveniently.

On the other hand, the processing is configured to be initialized when a predetermined time is passed after the hand h2 is moved off, so that when the passenger on the front passenger seat performs a slight operation and thereafter the driver tries to perform a complicated operation, this complicated operation cannot be performed, so that safety is further improved.

As described above, the set value of the time measurement of the timer 24 is set to a value for surely permitting a further operation and a modification of an operation by the passenger on the front passenger seat, and for not permitting an operation by the driver after the passenger on the front passenger seat performs an operation.

On the other hand, when the passenger on the front passenger seat performs a simple operation while the vehicle is running, the operation mode is changed to the driver mode by processing in step S113, the operation is performed, and the processing is initialized after the operation is completed.

Further, when the driver performs an operation while the vehicle is running, the driver places his/her left hand h1 on the operation switch unit 1 to operate the navigation system 100 while the vehicle is running, which appears as shown in FIG. 4A. Therefore, unlike the case of the passenger on the front passenger seat, one of the identifying sensors 11 and 12 is in a detecting state, or neither of them is in a detecting state.

This is done by processing in step S104, and the operator is judged to be the driver, so that the operation mode changes to the driver mode. In this driver mode, complicated operations are not allowed, so that the driver cannot perform operations which are too distractive, and thus the safety is improved.

Specifically, as shown in screens 91 and 93 of the display device 3 in FIG. 6, unlike the screen 92 of the case of the passenger on the front passenger seat, complicated operations are displayed as gray displays 93a when the screen changes from the screen 91 to the screen 93 so that the complicated operations cannot be selected.

In a case of an operation while the vehicle is stopped, all operations are allowed regardless of whether it is the driver or the passenger on the front passenger seat. This operation restriction according to the vehicle speed or the like allows the driver to perform operations that possibly affect driving in advance while the vehicle is stopped, and prohibits such operations while driving, so that the driver becomes conscious of not being interested in such operations having an effect on safety.

Next, release of restriction by a driver will be described.

It is conceivable that, when a driver is accustomed to operations, he or she memorizes an operation pattern to release the operation restriction of on-vehicle apparatuses for safety and tries to use this pattern. However, it is preferable to make such a case not happen as much as possible and not happen easily, so that the driver becomes conscious of not aiming at trying the release of the operation restriction. Accordingly, a case that the driver tries to release the restriction is processed as follows.

In a case that the driver attempts an operation after a passenger on a front passenger seat performs a simple operation, processing in step S105 changes the operation mode to the driver mode so as to accept operations by the passenger on the front passenger seat when the passenger on the front passenger seat performs the simple operation, so that even when the driver attempts an operation immediately thereafter, a complicated operation cannot be performed. Therefore, even in such a case, the driver is not able to perform a complicated operation while driving the vehicle, so that the safety improves.

On the other hand, when the driver performs an operation after the passenger on the front passenger seat performs a complicated operation, a time-out takes place to initialize the processing by the processing in step S108 to step S111, and then the operation mode changes to the driver mode when the driver subsequently performs an operation. Therefore, even in such a case, the driver is not able to perform a complicated operation while driving the vehicle, so that the safety improves.

Next, by the operation device of this embodiment, the following listed effects can be achieved.

Specifically, in the periphery of the multidirectional input portion 13 and the switch input portions 15 of the operation switch unit 1 provided on a console between the driver seat and the front passenger seat of a vehicle and at diagonal positions relative to the multidirectional input portion 13 and the switch input portions 15, the identifying sensors 11 and 12 which detect an approach of a hand of an operator are respectively provided, and the operation control unit 23 which identifies the operator by outputs from the identifying sensors 11 and 12 is provided, so that a detection distance thereof can be shortened to improve performance on identifying the operator. Further, the fact that the detection distance can be shortened allows downsizing of the system.

Further, since the identifying sensors 11 and 12 are provided respectively on a front oblique position and a rear oblique position diagonal to the front oblique position of the multidirectional input portion 13 and the switch input portions 15, a difference between the left hand and the right hand of a driver and a passenger can be detected by, the proximity detector, so that the operator can be surely identified.

Further, since the operation control unit 23 is configured to output an operation restriction/release of restriction of respective operation switches according to identification results by the identifying sensors 11 and 12, it is possible to more securely perform for safety the restriction on operation of an on-vehicle apparatus by the driver while driving the vehicle and the release of the operation restriction carried out when the passenger performs operations. Therefore, the safety and the convenience are made compatible.

Further, the operation switch unit 1 is provided with the operator identifying unit and is configured for integrally performing operations of a plurality of on-vehicle apparatuses, so that the operation restriction/release of the restriction of the plurality of on-vehicle apparatuses can be realized at a reduced cost with increased convenience.

Further, the operation switch unit 1 is configured to be operated by placing a hand on respective switches, so that a difference between the left hand and the right hand of a driver and a passenger when performing an operation by placing a hand on top surfaces of the switches can be detected by the proximity detector, which enables secure identification of the operator.

Further, based on identification results by the identifying sensors 11 and 12, the operation mode is selected from the front passenger seat mode to allow all operations while the vehicle is running, the driver mode to prohibit complicated operations while the vehicle is running, and the vehicle stop mode to allow all operations while the vehicle is stopped. Therefore, the driver becomes unable to perform complicated operations using the operation switch unit 1 while the vehicle is running to thereby improve safety, and then the passenger on the front passenger seat is allowed to perform operations with the operation switch unit 1 to thereby improve convenience.

Further, a simple operation by the passenger on the front passenger seat is performed in the driver mode, and the process is initialized after a complicated operation by the passenger on the front passenger seat is completed and a predetermined time passes. Thus, since the simple operation by the passenger on the front passenger seat is performed in the driver mode, the driver is prevented from avoiding the operation restriction by performing an operation just after the passenger performs an operation, and since the processing is initialized when the predetermined time passes after the complicated operation is performed by the passenger on the front passenger seat, the driver is prevented from avoiding the operation restriction by performing an operation just after the passenger performs an operation. Therefore, the safety can be further improved.

In the foregoing, the operation device of the present invention has been described based on the embodiment, but the specific configuration is not limited to the embodiment. Any change or addition of design, and the like are allowed without departing from the gist of the invention according to each of the appended claims.

Although the operation control unit 23 and the operation switch unit are arranged to be separated from each other, they may be integrated with each other.

In this embodiment, the driver uses his/her left hand and the passenger on the front passenger seat uses his/her right hand for operations, but when the vehicle is a left-hand drive vehicle, the hand for operation is inverted, so that the arrangement of the identifying sensors 11 and 12 on the left and right positions are symmetrically inverted as well.

Further, in the embodiment, an infrared sensor is used as the proximity detector, but it may be a different optical sensor or the like.

Further, the operation switch unit may have a different configuration, and the object to be operated with the operation switch unit is not limited to a navigation system, which may be a different on-vehicle apparatus.

The entire contents of Japanese Patent Application No. (Tokugan) 2003-334109 filed Sep. 25, 2003 are incorporated herein by reference.

What is claimed is:

1. An operation device, comprising:
   an operation switch provided between a driver seat and a front passenger seat of a vehicle, said operation switch being configured in such a manner that a palm of an operator is placed on a top surface of the operation switch to provide input by the operator;
   an operator detecting sensor which detects whether the palm of the operator is positioned on the top surface of said operation switch to input an operation;
   a pair of proximity detectors for detecting a proximity of a hand of the operator in the periphery of said operation switch, said proximity detectors being arranged on a driver seat side of said operation switch and on a front passenger seat side of said operation switch so as to have a diagonal relationship with said operations switch, wherein at least one of said proximity detectors is incapable of detecting the proximity of a hand of a driver when a palm of the driver is positioned on the top surface of said operation switch and both of said proximity detectors are capable of detecting the proximity of a hand of a passenger on the front passenger seat when a palm of the passenger is positioned on the top surface of said operation switch; and
   an operator identifying unit for identifying the operator based on outputs from said proximity detectors when the operator detecting sensor detects that the palm of the operator is positioned on said operation switch.

2. An operation device according to claim 1, wherein said operator identifying unit controls an operation restriction or a release of restriction of said operation switch depending on an identification result.

3. An operation device according to claim 1, wherein said operation switch is capable of controlling operations of a plurality of apparatuses which are on the vehicle.

4. The operation device according to claim 1, wherein said operation switch is configured to be operated by placing the hand of the operator on a top surface of said operation switch.

5. The operation device according to claim 1, wherein based on an identification result by said operator identifying unit, an operation mode is selected from a front passenger seat mode to allow all operations while the vehicle is running, a driver mode to prohibit complicated operations while the vehicle is running, and a vehicle stop mode to allow all operations while the vehicle is stopped.

6. The operation device according to claim 5, wherein a simple operation by the passenger on the front passenger seat is performed in the driver mode.

7. The operation device according to claim 1, wherein a process is initialized when a predetermined time passes after a complicated operation by the passenger on the front passenger seat is completed.

* * * * *